Oct. 13, 1925.
M. V. LIDDELL
1,556,941
DISK WHEEL
Filed Dec. 20, 1920
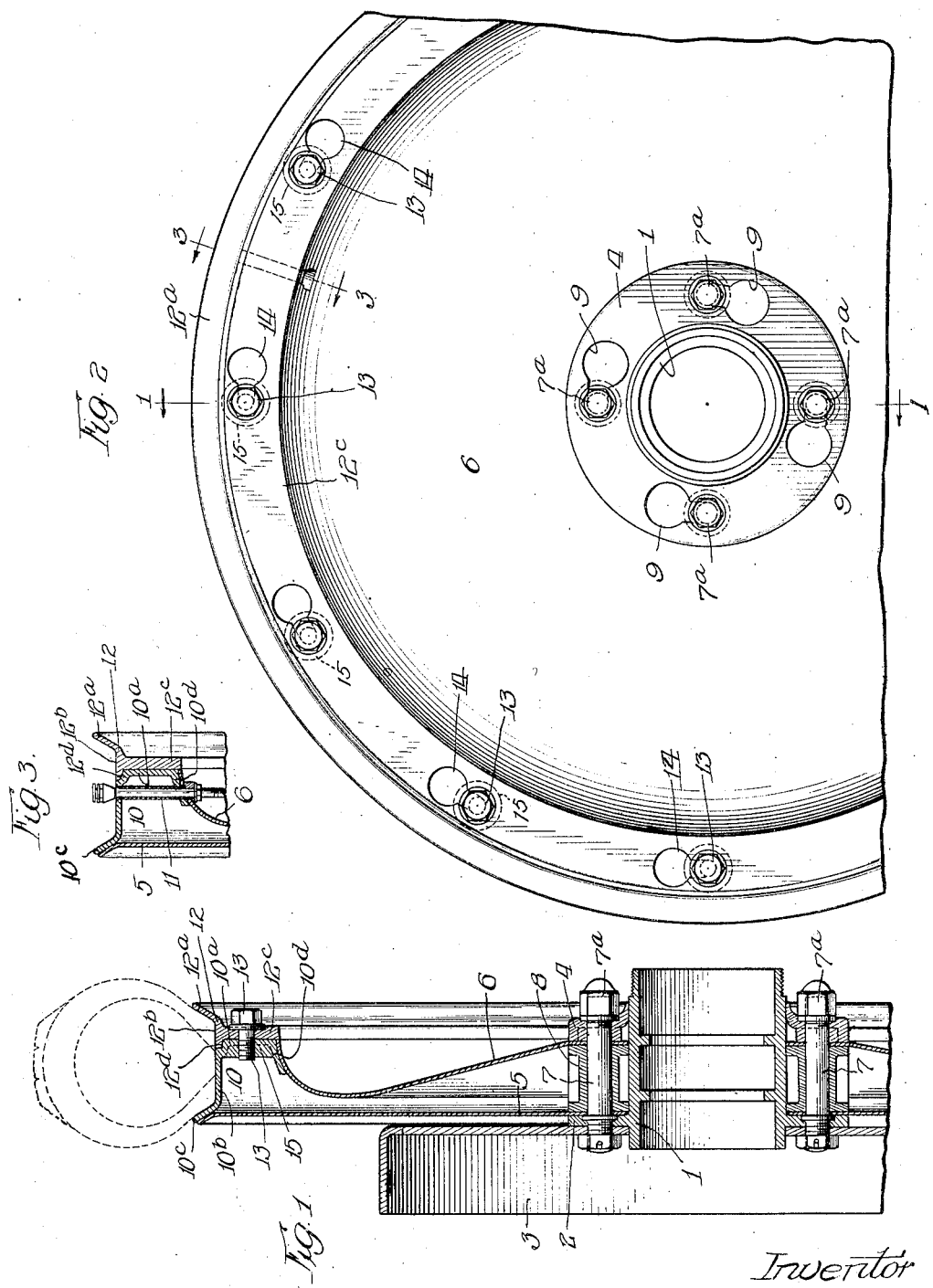
Witness:
R. Burkhardt
Inventor
M. Volney Liddell,
By Henry S. Knight, Atty.

Patented Oct. 13, 1925.

1,556,941

UNITED STATES PATENT OFFICE.

MOSES VOLNEY LIDDELL, OF MATTITUCK, NEW YORK.

DISK WHEEL.

Application filed December 20, 1920. Serial No. 432,159.

*To all whom it may concern:*

Be it known that I, MOSES VOLNEY LIDDELL, a citizen of the United States, and a resident of Mattituck, Long Island, in the State of New York, have invented certain new and useful Improvements in Disk Wheels, of which the following is a specification.

The present invention relates to vehicle wheels in which a hub member and a rim member are united by a web composed of a disk or disks, and has for its object to improve the construction of such a wheel, particularly in the matter of the construction of the rim and web and the manner of combining said parts.

One feature of the invention consists in making the rim of a channel member, separate from the web member or the disks thereof, and of a section that can be readily rolled, and the web of which channel assumes a substantially radial position while the flanges or side walls of the channel extend approximately in the direction of the axis of the wheel, with the outer one serving to receive a tire; also in attaching to the marginal portion of said outer flange of the rim one of two disks of which the wheel web is composed, and to the inner flange the other wheel disk; the latter being attached by lapping it upon a face of said inner flange in a manner to give direction to and reinforce the joint of attachment and to develop a dishing of said disk on lines that increase the resiliency of the web; the position of the dished disk in relation to the rim being such that it transmits a large proportion of the load from the hub to the rim.

Another feature of the invention consists in constructing the web of a disk wheel with a disk that is secured to both the rim and to the hub on one side of a medial radial plane of the wheel, but which is dished in such a manner that it intersects said plane and so develops the resiliency referred to.

Still another feature consists in utilizing a channeled rim member of the kind herein described to define and sustain an outer side wheel cavity into which the inflating stem of a pneumatic tire may extend in order to render it accessible from the outside of the wheel, the peripheral and inner flanges of the axially presented annular channel affording substantial walls in which to secure the guide for the inflating tube.

In the accompanying drawings,—

Figure 1 represents an axial section and Figure 2 a side elevation of a wheel embodying the several features of the present invention.

Figure 3 is a radial section through the rim in the plane of the inflating stem of the tire as indicated by the line 3—3 in Figure 2.

1 represents the hub having the attaching flange 2 which receives the brake drum 3, and 4 represents the clamping ring between which and the flange 2 the disks 5 and 6 which compose the web of the wheel are clamped through the medium of bolts 7 carrying filler sleeves 8. Preferably there is one filler sleeve 8 for each bolt 7 and these are permanently united with the inner or central portions of the disks 5, 6, by spot welding or other suitable means. Bolts 7 may serve to hold the brake drum 3, as well as to unite the web to the hub. As will be seen from Figure 2, the nuts 7ª of the bolts 7 are counter-sunk in the clamping ring 4 and the latter is provided with keyhole slots 9, so that by turning back the nuts 7ª sufficiently to lift them out of their seats in the ring 4, said ring may be rotated and removed without expending the time wholly to remove the nuts. As thus far described, the invention corresponds with the subject matter of my co-pending application, Serial No. 375,762 filed April 22, 1920.

The rim 10 is composed of a channel bar, preferably of a section that can be successfully rolled, and is positioned with the channel web 10ª substantially in a radial plane while its outer flange 10ᵇ forms a substantial portion of the tread of the wheel to receive a pneumatic tire or demountable rim carrying such a tire, the extreme margin of said outer flange being upturned as shown at 10ᶜ to provide one of the confining walls for the tire.

The inner flange 10ᵈ of the rim 10, like the outer flange thereof, extends in a substantially axial direction, although preferably slightly curved toward the center, and serves not only greatly to stiffen the rim against distortion from the plane of revolution and against radially imposed loads, but also affords a very advantageous attaching base for the disk 6 which is laid upon the face of the flange 10ᵈ and spot welded or otherwise connected therewith. This mode of attachment gives to the section of the disk 6 an axial direction through a part of its dimension, which gradually turns to an approximately radial direction and outward inclination until it meets the hub. Disk 6 is thus secured to the rim and to the hub on the same side of the medial radial plane of wheel, but it is also dished or concaved to such a degree as to cross said plane and develop a substantial cavity or dishing which affords a pocket or space in which the inflating end of the valve tube can be exposed and rendered convenient of access. To this last named end, the rim 10 has a radial thimble or bushing 11 extending through its outer and inner flanges and through the axially inclined portion of the disk 6. The flange $10^d$ is preferably of such axial dimension as to afford substantial support for the inner end of said bushing. By means of this bushing water and dirt are excluded from the space between the disks which is otherwise closed by disks 5 and 6 and rim member 10.

Disk 5 extends from the inner end of the hub, preferably in a radial plane, until it meets the upturn of the margin $10^c$ of the tread or outer flange of the rim where it is spot welded or otherwise suitably secured.

By the described disposition of the disks, the wheel load is largely imposed on the dished disk 6, the form of which develops a substantial degree of resiliency, while the disk 5 greatly steadies the rim against distortion or twisting upon the disk 6, but is sufficiently offset from the medial loading plane to avoid imposing too much stiffness to the wheel.

A complementary confining flange number 12 having rim flange $12^b$ and affording a portion of the tread, is secured to the web $10^a$ of the channel 10, by means of screws 13 passing through its deep radial annulus $12^c$, preferably corresponding in radial dimension to that of channel web $10^a$, and said flange member is stepped into the channel member 10 at $12^d$ in a manner to transmit the greater portion of its radial load to said channel member. Screws 13 are seated in keyhole slots 14 in a manner similar to that described in connection with the clamping ring 4. This feature is included in the subject matter of my aforesaid co-pending application.

If desired, fillets or reinforcing disks 15 may be inserted in the channel of rim 10 at intervals to increase the threaded engagement of the screws 13 as shown in Figure 1.

I claim:

1. In a wheel, a rim comprising an annulus of channel section having the web of the channel presented in substantially the radius of the wheel, and its outer flange assuming the position of a tread or tire-receiving member; said wheel having a separately formed disk overlapped upon and attached to the inner flange of its said rim and extending with said inner flange, and from the same, at a substantial angle to the radial plane of the wheel.

2. In a wheel, a rim comprising an annulus of channel section having the web of the channel presented in substantially the radius of the wheel, and its outer flange assuming the position of the tread or tire-receiving member; said wheel also having a separately formed web member comprising a disk attached to the inner flange of the channel shaped rim, and extending from said inner flange, in the direction thereof, across the medial radial plane of the wheel.

3. In a wheel, a rim comprising an annulus of channel section having the web of the channel presented in substantially the radius of the wheel, and its outer flange assuming the position of the tread or tire-receiving member and its inner flange having attached thereto a separately formed web member; said inner flange and attached web member extending at a substantial angle to and across the medial radial plane of the wheel and thence back to the same side of said plane as that of its attachment to the felly.

4. In a wheel, a rim comprising an annulus of channel section having the web of the channel presented in substantially the radius of the wheel, and its outer flange assuming the position of a tread or tire-receiving member; said wheel also having a web member comprising two disks one of which is attached to the margin of the outer flange of said rim and the other to the inner flange of the channel shaped rim, and extending from said inner flange, in the direction thereof, across the medial radial plane of the wheel and thence inwardly to the hub, thereby developing a dishing or annular pocket adjacent to said inner rim flange.

5. In a wheel, a rim comprising an annulus of channel section having the web of the channel presented in substantially the radius of the wheel, and its outer flange assuming the position of a tread or tire-receiving member; said wheel also having a web member comprising two separately formed disks one of which is attached to the margin of the outer flange of said rim and the other to the inner flange thereof, and extends from said inner flange, in the direction thereof, across the medial plane of the wheel and thence inwardly to the hub, thereby developing a dishing or annular pocket adjacent to said inner rim flange, said rim having an opening to receive a tire inflating stem lying on the side of both said disks toward the web of the channel section, and extending through both flanges.

6. In a wheel, a rim comprising an annulus of channel section having the web of the channel presented in substantially the radius of the wheel, and its outer flange assuming the position of a tread or tire-receiving member and its inner flange carrying a front web member; said wheel having a rear web member spaced axially from the front web member and attached to the outer flange of the rim; said front web member being dished to deflect it across the medial plane of the wheel and said rear web member being in a plane radial to the hub and to the rim at the point of attachment thereto.

7. In a wheel, a rim comprising an annulus of channel section having the web of the channel presented in substantially the radius of the wheel, and its outer flange assuming the position of a tread or tire-receiving member and its inner flange carrying a front web member; said wheel having a rear web member spaced axially from the front web member and attached to the outer flange of the rim; said front web member being secured to the hub and rim on the same side of the medial radial plane of the wheel, but dished intermediately to deflect it across said plane, and said rear web member lying in a plane radial to the hub and the inner side of the outer flange of the rim and on the side of said medial plane opposite to the attachment of the front web member.

Signed at Mattituck, New York, this 18 day of December, 1920.

MOSES VOLNEY LIDDELL.